Sept. 29, 1931.  J. L. HECHT  1,824,888
TENSION WHEEL AND METHOD OF MAKING THE SAME
Filed Sept. 11, 1930    2 Sheets-Sheet 1
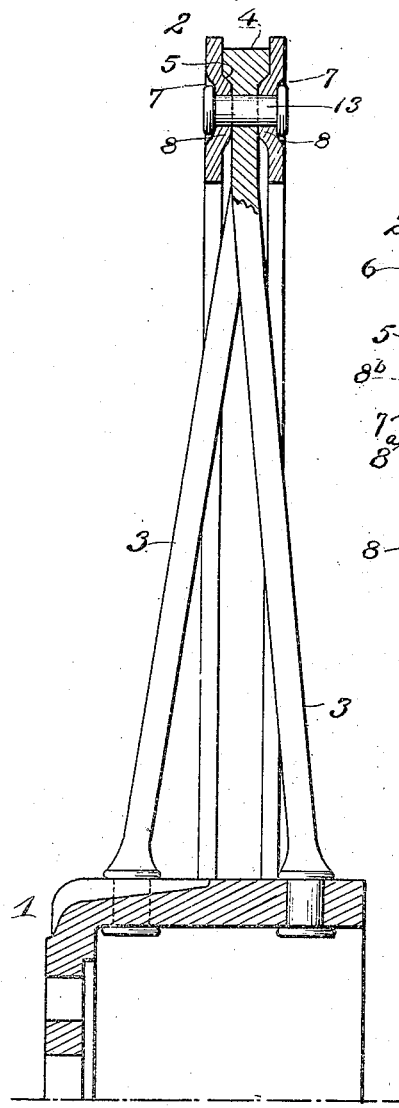
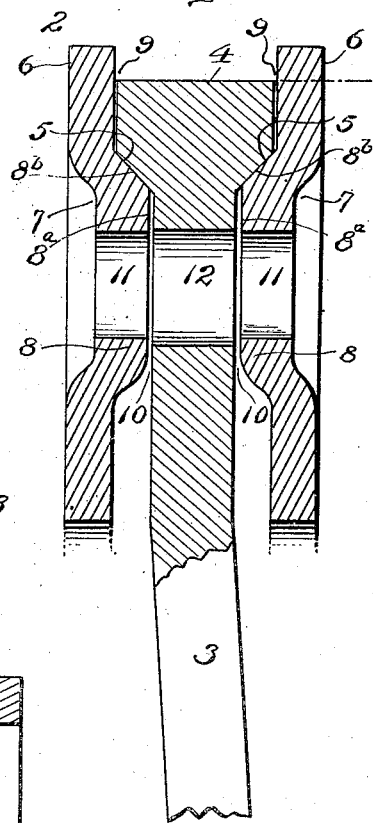
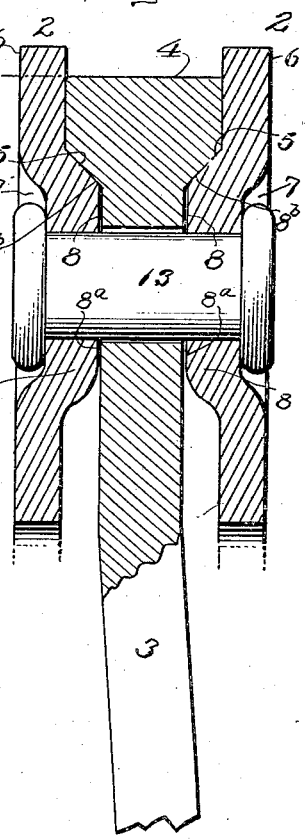
INVENTOR.
J. L. Hecht
BY
Morrison, Kennedy Campbell
ATTORNEYS.

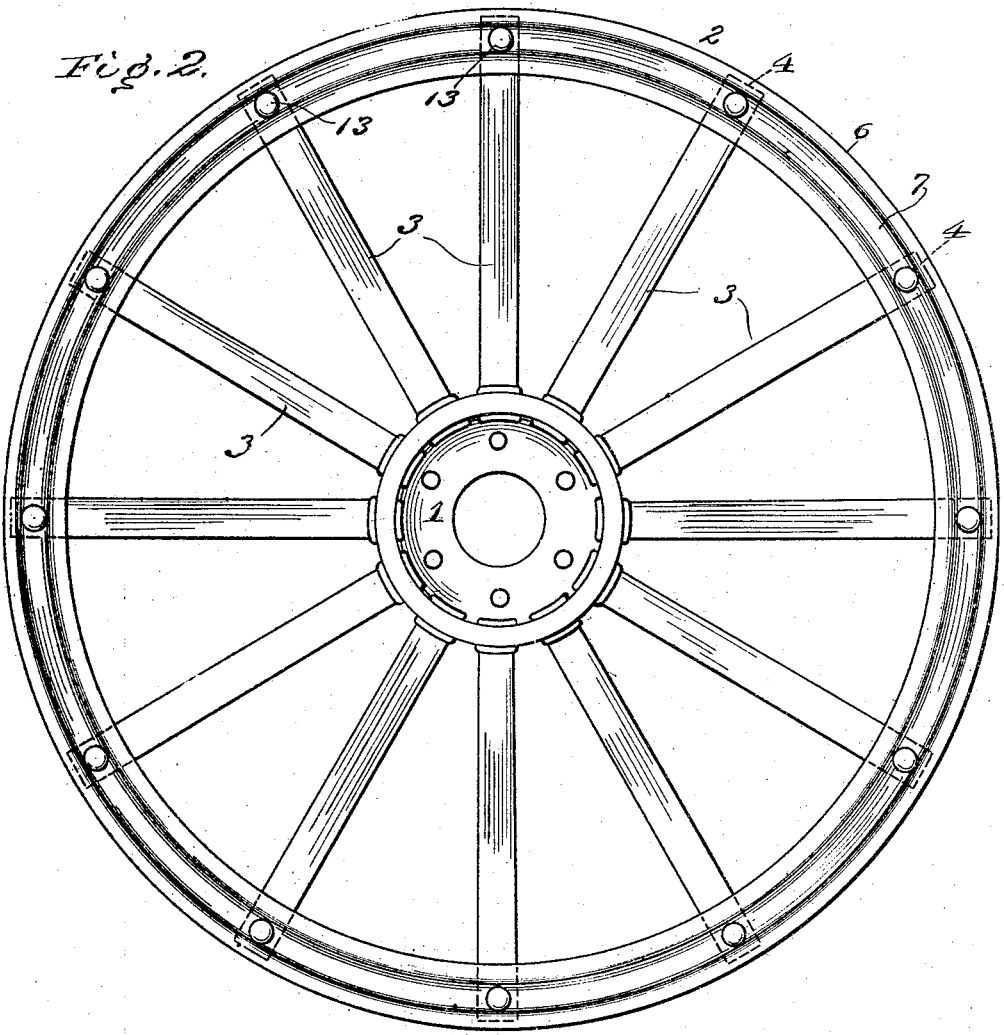

Patented Sept. 29, 1931

1,824,888

UNITED STATES PATENT OFFICE

JOSEPH L. HECHT, OF DAVENPORT, IOWA, ASSIGNOR TO FRENCH & HECHT, INCORPORATED, A CORPORATION OF IOWA

TENSION WHEEL AND METHOD OF MAKING THE SAME

Application filed September 11, 1930. Serial No. 481,118.

This invention relates to the production of metal tension wheels, i. e., wheels in which the spokes are in stretched or tensioned condition, and the invention consists in an improved form of wheel of this type, of simple, durable and effective construction, in which the spokes will be maintained under a uniform tension; and the invention consists also in the method of producing such a wheel.

In the specification to follow, the invention will be described in detail, and the novel features thereof will be pointed out in the appended claims.

In the accompanying drawings:—

Fig. 1 is a section taken axially through one side of the improved wheel, showing the invention in its preferred form;

Fig. 2 is an elevation of the wheel;

Fig. 3 is a cross section on an enlarged scale through the outer end of an untensioned spoke and the adjacent rim sections, showing the assembled relation of said parts before the rim sections are forcibly drawn towards each other on the spoke; and Fig. 4 is a similar view, showing the rim sections forcibly drawn together on the spokes to tension the same, and showing also the rivet holding the sections in forcible engagement, so as to maintain the tension on the spoke.

Referring to the drawings:

The wheel as herein shown by way of example to illustrate the invention, comprises an inner annular wheel member or hub 1, an outer annular wheel member or rim 2, and a series of spokes 3 connected at their ends to said members respectively.

The spokes, in the position of the parts shown in Fig. 1, illustrating the completed wheel, are under tension, thereby constituting a tension wheel, said spokes having been stretched endwise in the application to their outer ends of the rim member of the wheel, in accordance with my improved method.

In tensioning spokes in accordance with the invention, the spokes before they are assembled to the wheel, are provided on their outer ends with enlargements or heads 4 which are formed on opposite sides with oppositely inclined surfaces 5, and the spokes are engaged at their inner ends with the hub in any suitable manner, preferably by connecting their inner ends permanently with the hub, as by the formation of heads on the inner ends of the spokes within the hub, and shoulders on the spokes outside the hub to bear thereon, as shown in Fig. 1.

The rim member 2 is in the form of two annular rings or sections 6, which are corrugated circumferentially, so as to form grooves 7 in the outer sides of the sections, and corresponding ribs 8 on their inner sides, these ribs being flattened as shown at $8^a$, so as to conform to the opposite flattened sides of the spokes just inward of their heads. The outer edges of the ribs 8 are formed with inclined surfaces $8^b$, which are adapted to cooperate with the inclined surfaces 5 on the spoke heads. The form and relation of the parts are such that, when the two rings are applied to the opposite sides of the spokes, they will occupy positions relative thereto, as shown in Fig. 3, in which it will be seen that the inclined surfaces $8^b$ on the rim sections while abutting against the inclined surfaces 5 on the spoke heads, will extend a slight distance outward beyond the outer ends of said surfaces 5, leaving slight clearance spaces 9 between the inner sides of the rim sections and outer sides of the spoke heads, and clearance spaces 10 between the flattened inner surfaces of the ribs and the adjacent outer sides of the spokes. As a result of this form and relation of the parts, when the two rim sections are forced towards each other against the spokes, as shown in Fig. 4, as will be presently described, these inclined surfaces riding up on each other, will pull endwise on the spokes, and will stretch the same, and thereby place them under tension.

Previous to the assemblage of the parts, transverse rivet holes 11 are formed in the annular rim sections, and transverse rivet holes 12 are formed in the spokes just inward of their heads, the relative disposition of these rivet holes being such that when the rim sections are applied to the opposite sides of the spokes, the holes in said sections will aline with those in the spokes. The rim sections are forced towards each other against the sides of the spokes in order to produce the tension just mentioned, by means of rivets 13, which are extended through the alined holes in the rim sections and spokes, and are headed down as at 14, so as to press the sections together on the spokes with great force, the heads of the rivets being seated in the circumferential grooves in the rim sections, and thus shielded and countersunk, so that they will not materially project beyond the side faces of the rim member, and thus tend to take up dirt and trash in the rotation of the wheel on the ground.

While in the foregoing description of the invention, the spokes are shown as connected at their inner ends with the hub, and at their outer ends between the rim sections to produce the tension, the invention is not to be limited to this particular method of securing the tension, since it would be possible to tension spokes without departing from the invention, by attaching their outer ends permanently to a rim section, and forming heads on their inner ends to be clamped between two annular sections constituting the hub of the wheel, such arrangement and method of procedure being the reversal of that hereinbefore set forth.

Also, it is obvious that various changes may be made in the form and detailed construction of the parts, and in the sequence of steps of the method, such as would suggest themselves to those skilled in the art, without departing from the limits of the invention; and it will therefore be understood that the invention is not limited, either in respect to the method of operation or the novel construction disclosed, except in so far as such limitations are specified in the claims.

Having thus described my invention, what I claim is:—

1. The method of making tension wheels, which consists in providing spokes having inclined side surfaces at one end, engaging the opposite ends of said spokes with one of the annular members of a wheel, applying to the opposite sides of the free ends of the spokes complementary annular sections formed on their inner sides with inclined surfaces to cooperate with those on the spokes, said annular sections constituting the other annular member of the wheel, drawing said annular sections forcibly toward each other on the spoke ends to cause the inclined surfaces to ride upon each other and thereby stretch the spokes endwise and tension them, and holding said sections against separation to maintain the tension on the spokes.

2. The method of making tension wheels, which consists in providing spokes having heads at one end provided with inclined side surfaces, engaging the opposite ends of said spokes with one of the annular members of a wheel, applying to the opposite sides of the heads of the spokes complementary annular sections formed on their inner sides with inclined surfaces to cooperate with those on the spokeheads, said sections constituting the other annular member of the wheel, drawing said annular sections forcibly toward each other on the spoke heads and thereby stretch the spokes endwise and tension them, and holding said sections against separation to maintain the tension on the spokes.

3. The method of producing tension wheels, which consists in providing spokes having at their outer ends inclined side surfaces, engaging the inner ends of said spokes with a hub member, applying to said side surfaces complementary annular rim sections formed on their inner sides with inclined surfaces to cooperate with those on the spokes, drawing said annular sections forcibly toward each other on the spoke ends to cause the inclined surfaces to ride upon each other and thereby stretch the spokes endwise and tension them, and holding said sections against separation to maintain the tension on the spokes.

4. The method of producing tension wheels which consists in providing spokes having at one end transverse rivet holes and inclined side surfaces, engaging the opposite ends of the spokes with one of the annular members of a wheel, applying to the inclined sides of the free ends of the spokes complementary annular sections formed at intervals with rivet holes spaced to aline with the rivet holes in the spokes, and provided on their inner sides with inclined surfaces to cooperate with those on the spokes, said annular section constituting the other annular member of the wheel, placing rivets in said alined holes in the annular sections and spokes, and heading the ends of said rivets against the outer sides of the sections to draw said sections forcibly toward each other on the spoke ends, and thereby cause the inclined surfaces to ride upon each other and stretch the spoke endwise and tension the same.

5. In the method of making tension wheels, the step of tensioning the spokes by subjecting the sides of the same at one of their ends, to side pressure between annular sections constituting one of the annular members of the wheel, while causing said pressure to stretch the spokes endwise.

6. In the method of making tension wheels in which the spokes are fastened at their inner ends to the hub. tensioning said spokes by subjecting the sides of the same at their outer ends, to side pressure between two annular rim sections, while causing said pressure to stretch the spokes endwise.

7. In a wheel, the combination of two annular wheel members, one of which comprises two annular complementary sections provided on their inner sides with inclined surfaces, tensioned spokes engaged at one of their ends to the other wheel member and extending at their opposite ends between said annular sections, said spokes being provided at said ends with inclined side surfaces forcibly engaged by the inclined side surfaces on said sections, and means acting on the annular sections to hold them forcibly engaged with the spoke ends to maintain the spokes under tension.

8. In a wheel, the combination of a hub, a rim member composed of two annular sections formed on their inner sides with inclined surfaces, tensioned spokes engaged at their inner ends with the hub, and provided at their outer ends with inclined side surfaces forcibly engaged with the inclined surfaces on the rim sections, and means acting on the rim sections to hold them forcibly engaged with the spoke ends to maintain the tension on the spokes.

9. In a wheel, the combination of two annular wheel members, one of which comprises two annular complementary sections provided on their inner sides with inclined surfaces, tensioned spokes engaged at one of their ends with the other wheel member, and extending at their opposite ends between said annular sections, said spokes being provided at said ends with inclined side surfaces engaged with the inclined side surfaces on said sections, and rivets extending through the annular sections and spokes between them, and acting to hold the parts forcibly engaged to maintain the tension on the spokes.

10. In a wheel, the combination of a hub, a rim member composed of two annular sections formed on their inner sides with inclined surfaces, tensioned spokes engaged at their inner ends with the hub, and provided at their outer ends with inclined side surfaces forcibly engaged with the inclined surfaces on the rim sections, and rivets extending through said rim sections and spoke ends between them, and acting to hold said parts in forcible engagement.

11. In a wheel, the combination of a hub, a rim member composed of two annular sections formed with circumferential corrugations, presenting in the outer sides, grooves, and on the inner sides, corresponding ribs having on their outer edges oppositely inclined surfaces, tensioned spokes fastened at their inner ends to the hub and having heads on their outer ends provided on their inner sides with inclined surfaces seated against those on the ribs, and rivets extending through the ribbed portions of the rim sections and through the spokes between them, and having their heads extending in the external grooves in said sections.

In testimony whereof, this specification has been duly signed by:

JOSEPH L. HECHT.